United States Patent
Tan (10) Patent No.: US 10,649,824 B1
(45) Date of Patent: May 12, 2020

(54) EVENT SUBSCRIPTION AND MANAGEMENT SYSTEM

(71) Applicant: MASSACHUSETTS MUTUAL LIFE INSURANCE COMPANY, Springfield, MA (US)

(72) Inventor: Meng Wee Tan, Belchertown, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 43 days.

(21) Appl. No.: 16/140,291

(22) Filed: Sep. 24, 2018

Related U.S. Application Data (60) Provisional application No. 62/564,860, filed on Sep. 28, 2017.

(51) Int. Cl.
| | |
|---|---|
| *G06F 9/54* | (2006.01) |
| *G06F 9/48* | (2006.01) |
| *G06F 9/451* | (2018.01) |
| *H04L 29/08* | (2006.01) |

(52) U.S. Cl.
CPC .............. *G06F 9/542* (2013.01); *G06F 9/451* (2018.02); *G06F 9/4843* (2013.01); *H04L 67/06* (2013.01)

(58) Field of Classification Search
CPC ....................................................... G06F 9/542
See application file for complete search history.

(56) References Cited

U.S. PATENT DOCUMENTS

| | | | | |
|---|---|---|---|---|
| 2010/0333094 | A1* | 12/2010 | Restall | G06F 9/5027 718/102 |
| 2017/0109201 | A1* | 4/2017 | Parker | G06F 9/4881 |
| 2019/0266011 | A1* | 8/2019 | Fang | G06F 9/485 |

* cited by examiner

*Primary Examiner* — Brian W Wathen
(74) *Attorney, Agent, or Firm* — Eric L. Sophir; Foley & Lardner LLP (57) ABSTRACT

An enterprise system for an event management framework is described where an event subscription processor detects and/or creates computer-executable events, which are then published on user interface of multiple computing devices configured to subscribe, process, and execute the computer-executable events. The event subscription processor may enable processing and execution of one or more computer-executable events in a mode that the computer-executable event execution and management is centralized, and performed in a consistent manner within an organization. The event subscription processor allows the computer-executable event execution tasks/processes to be easily created, modified, and managed in one single enterprise system.

20 Claims, 3 Drawing Sheets

EVENT SUBSCRIPTION AND MANAGEMENT SYSTEM

CROSS REFERENCES TO RELATED APPLICATIONS

This application claims priority to U.S. Provisional Application Ser. No. 62/564,860, filed Sep. 28, 2017, which is hereby incorporated by reference in its entirety.

TECHNICAL FIELD

This application relates generally to an event management framework, and more specifically to subscription and processing of multiple computer-executable events by multiple computing devices within an enterprise network of an organization.

BACKGROUND

Typically, in an organization, various computer-executable tasks and functions are executed by various computing systems of the organization. In some cases, during the execution of the various computer-executable tasks within the organization, some of the computer-executable tasks and functions may be duplicated across the multiple computing systems. This supplication of the computer-executable tasks and functions occurs because different computers executing the task may belong to different computing systems. For instance, a computer executing a task and its corresponding computer-executable scripts may belong to a legacy computing system. Furthermore, another computer, from a newer or different computing system, may be assigned to execute the same task. As a result, much computing and processing power is mismanaged on executing the same tasks and scripts, which is undesirable and costly.

To remedy the above-mentioned technical problem, some organizations have implemented operational modifications across the multiple computing systems that are continuously running and implementing various computer-executable tasks and functions. However, modifying computing systems (e.g., legacy computing systems) is costly and time-consuming.

SUMMARY

What is therefore needed is an event driven framework for execution of various computer-executable tasks and functions that solve the above-mentioned problems. As described herein, embodiments of a present disclosure relate to enterprise systems, apparatuses, methods, and computer program products for an event management framework where an event subscription processor detects and/or creates computer-executable events, which are then published on a user interface of multiple computing devices configured to subscribe, process, and execute the computer-executable events. The event subscription processor may facilitate processing and execution of one or more computer-executable events (for example, a computer-executable event associated with creating a digital bill statement, a computer-executable event associated with an online customer correspondence via an electronic communication, or a computer-executable event associated with generating a digital disbursement check) in a manner that the computer-executable event execution and management is centralized and performed in a consistent manner within an enterprise network of an organization. The event subscription processor allow the computer-executable events and tasks associated with the computer-executable events to be effortlessly created, modified, and managed in one single administration enterprise system rather than having all the computer-executable tasks/processes associated with the event dispersed and duplicated in multiple administration enterprise systems and implemented using different technologies.

An event management framework may create computer-executable tasks and/or processes for execution of computer-executable events through configuration and scripting without a need for programming (e.g., code changes). For example, a server computer may create a computer-executable event process by configuring the computer-executable event process to execute a set of atomic and reusable sub-process steps, enabling the computer-executable event process to be quickly set up and subsequently modified. The configuration and scripting utilized herein enables the computer-executable events to be implemented without the need for coding using a standard framework and standard technologies, and significantly reducing a time-to-market of business solutions.

In an embodiment, a server-implemented method comprises identifying, by a server, a plurality of computer-executable events, each computer-executable event comprising an event identifier; retrieving, by the server using the event identifier, one or more rule files associated with each computer-executable event, each rule file comprising a first set of commands for execution of each computer-executable event; generating, by the server based on at least one rule file, a plurality of computer-executable tasks for each computer-executable event where each computer-executable task is configured to be synchronously or asynchronously executed by at least one computer within a plurality of computers, each computer-executable task comprising at least a second set of commands, wherein each second set of commands of each computer-executable task comprises at least a portion of the first set of commands; identifying, by the server, a first computer-executable task common among the plurality of computer-executable events; upon identifying a first computer configured to execute a first set of commands of the first computer-executable task, transmitting, by the server to the first computer, a first instruction causing the first computer to execute the second set of commands of the first task; upon identifying a second computer within the plurality of computers configured to execute a second computer-executable task, transmitting, by the server to the second computer, a second instruction to not execute the second set of commands of the first computer-executable task; when the first computer executes the second set of commands of the first computer-executable task transmitting, by the server, a file generated by the first computer in response to execution of the second set of commands of the first computer-executable task, to the second computer; and instructing, by the server, the second computer to execute a second set of commands of the second computer-executable task using the file.

In another embodiment,

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Figure 1:
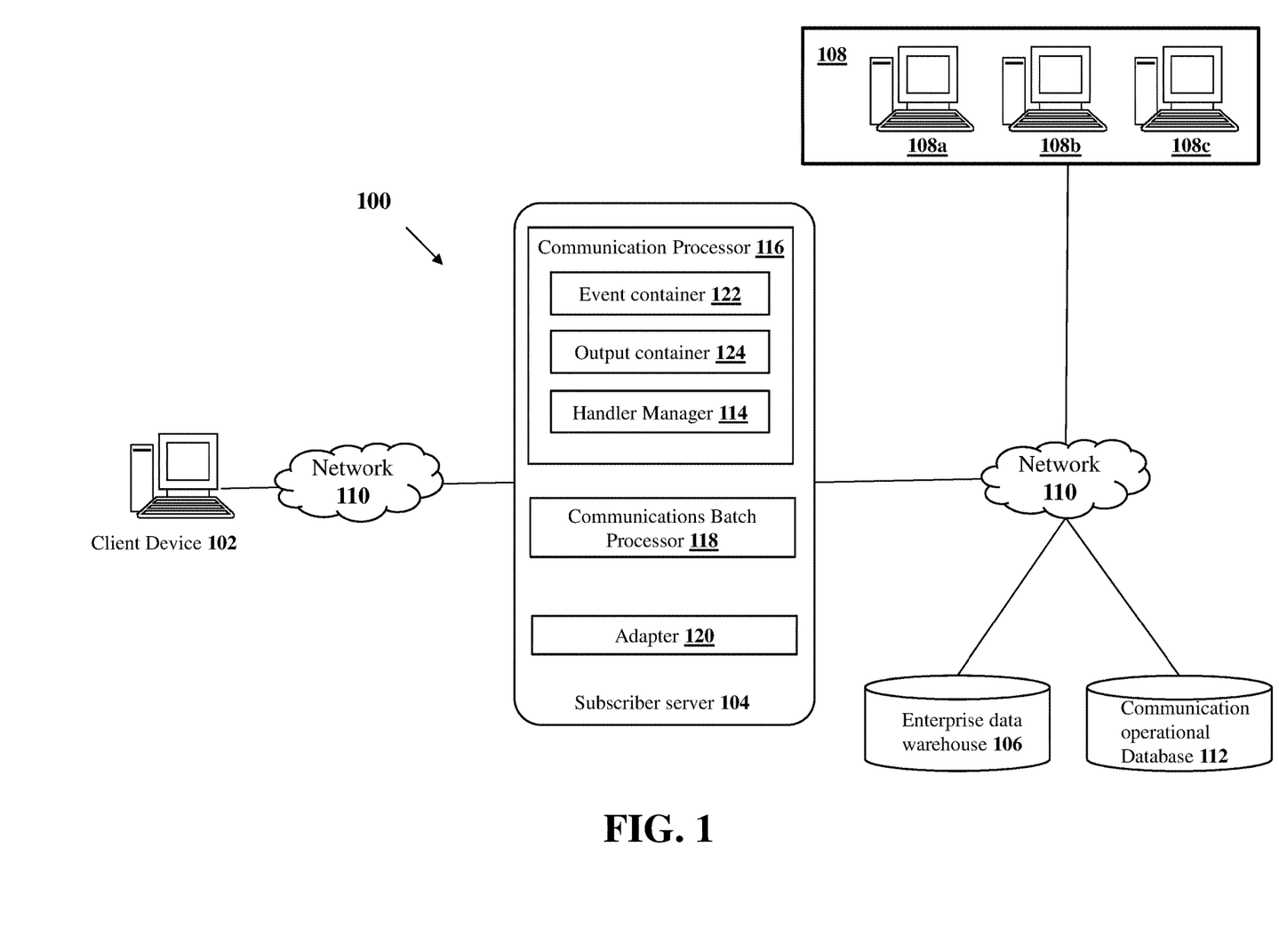
FIG. 1 shows components of an event subscription and management system, according to an embodiment.

FIG. 1 shows components of an event subscription and management system 100. The event subscription and management system 100 may include client devices 102, subscriber servers 104, enterprise data warehouse/databases 106, computing devices 108a-108c (collectively referred to as computing devices/servers 108), and communication operational databases 112. The system 100 is not confined to the components described herein and may include additional or alternate components, which are to be considered within the scope of the embodiment. The functionality attributed to a component of the system 100 may be fully or partially executed by other components of the system 100.

A client device 102, a subscriber server 104, an enterprise data warehouse/database 106, a communication operational database 112, and one or more computing devices/servers 108a-108c may be connected to each other through a network 110. The examples of the network 110 may include, but are not limited to, private or public LAN, WLAN, MAN, WAN, and the Internet. The network 110 may include both wired and wireless communications according to one or more standards and/or via one or more transport mediums. The communication over the network 110 may be performed in accordance with various communication protocols such as Transmission Control Protocol and Internet Protocol (TCP/IP), User Datagram Protocol (UDP), and IEEE communication protocols. In one example, the network 110 may include wireless communications according to Bluetooth specification sets, or another standard or proprietary wireless communication protocol. In another example, the network 110 may also include communications over a cellular network, including, e.g., a GSM (Global System for Mobile Communications), CDMA (Code Division Multiple Access), EDGE (Enhanced Data for Global Evolution) network.

The subscriber server 104 is a computing device including a processor and a non-transitory machine-readable storage medium, and capable of performing the various processes described herein during execution. Non-limiting examples of the subscriber server 104 may include a desktop computer, a server computer, a laptop computer, a tablet computer, and the like. For ease of explanation, FIG. 1 shows a single computing device functioning as the subscriber server 104. However, some embodiments may include any number of computing devices capable of performing the various tasks described herein.

The subscriber server 104 may receive one or more computer-executable events from various types of event-generating/detection electronic devices within a system 100. Hereinafter, the term "event" or the "computer-executable event" may be interchangeably used. In some embodiments, the subscriber server 104 may receive one or more events from a client device 102. The events may be log files or machine-readable code containing various data fields describing a detected incident, such as, but not limited to, a request to open an account, a request to generate an invoice, a request to file an insurance claim, and/or a request to make a payment.

The subscriber server 104 and/or various types of event-generating/detection devices of the system 100 may identify and/or detect events based one or more pre-defined rules of an organization implementing the system 100. The one or more pre-defined rules of the organization may be stored within a communication operational database 112. The subscriber server 104 and/or various types of event-generating/detection devices of the system 100 may identify and/or detect events in accordance with defined organization process pre-defined rules stored within the communication operational database 112. The subscriber server 104 and/or various types of event-generating/detection devices of the system 100 may also be able to identify and/or detect the events based on processing of data associated with an incident from various internal and external data sources of the system 100. In some embodiments, the subscriber server 104 and/or various types of event-generating/detection devices of the system 100 may utilize information corresponding to correlation of data associated with one or more actions by a customer to identify and/or detect events. In some embodiments, the subscriber server 104 and/or various types of event-generating/detection devices of the system 100 may utilize inferences and/or predictive pre-defined rules/policies stored within the communication operational database 112 involving the occurrence of compound events in identifying real events that needs to be processed by various computing devices 108.

In a non-limiting example case of detecting an event by the subscriber server 104 and/or various types of event-generating/detecting devices of the system 100, the subscriber server 104 and/or the various types of event-generating/detecting devices may host an application server and/or a webserver, either of which may include software modules allowing a client device 102 to access data in a communication operational database 112 or an enterprise data warehouse 106. A potential client/customer to the system 100, who may be operating the client device 102, may point a web browser application executed by the client device 102 to a website hosted on the webserver. In such a case, a webserver may generate a new event such as a user event, a system event, or a business event upon receiving credentials from a user of a client device 102. The new user event generated by the webserver may include an event identifier and an event body. An event identifier of a new user event may contain data fields associated with an event registration ID identifying a type of event, a policy number being registered by a user, an agent ID of the user, an agent number, and a customer ID. An event body of the new user event may contain relevant data and information corresponding to the event. The webserver may then transmit the new user event to the subscriber server 104 or any other servers of the system 100. Upon receiving a notification message regarding the new user event from the webserver, the subscriber server 104 or any other server of the system 100 may then associate the new user event with a new customer account based on analysis of the data fields of the new user event. The new user event may contain a data field indicating a customer identifier value that is unique to the customer. The subscriber server 104 or any other server of the system 100 may then store the new user event into the enterprise data warehouse 106.

The subscriber server 104 may execute various processes on incoming events received from various event-generating devices and/or a client device 102, such as data field formatting, identifying an associated customer, identifying an associated agent, identifying an associated department, or evaluation of data fields contained within the event in form of an event identifier and an event body.

Based on the processing of the incoming event by the subscriber server 104 or any other server of a system 100, the subscriber server 104 may retrieve a set of rule files from a communication operational database 112 that should be applied to the event at least based on evaluation of the data fields contained within the event in form of the event identifier and the event body. For example, if the event received by the subscriber server 104 or any other server of the system 100 corresponds to opening an insurance policy, then the identified category of the event may be an account opening department based on the data fields of the event, and the subscriber server 104 may retrieve a set of rule files from the database 106 associated with the account opening department. The subscriber server 104 then processes data items of the event according to the set of rule files retrieved from the communication operational database 112. A rule file represent a programmable logic that is applied to the data fields within the event in order to determine one or more computer-executable tasks (such as synchronous computer-executable tasks or computer-executable asynchronous tasks) for the processing of the event. Hereinafter, the term "task" or the "computer-executable task" may be interchangeably used. In some embodiments, a rule file may be a section of a code that is focused on a computation of a specific organization policy expressed by a computation of value of a single or group of variables. In a non-limiting example, an organization rule may be a subroutine used to qualify a user/customer, and determine a premium for user's request of opening an insurance policy. Such organization rule can be applied by the subscriber server 104 on the event corresponding to the user's request of opening the insurance policy to generate one or more tasks that are to be executed for processing the user's request associated with the opening of the insurance policy. For example, based on the application of the rule files associated with the account opening department on the data fields associated with the event corresponding to the user's request of opening the insurance policy, the subscriber server 104 may generate an action plan that may include one or more tasks (such as computer tasks) to be executed by the different computing devices 108 of the system 100. The one or more tasks (such as computer tasks) correspond to determining (a) a qualification of user; (b) an availability of insurance plans; (c) determining whether based on user data the user merits a premium account; and/or (d) what is the best plan for the user based on the user data.

A specific computing device 108 of a system 100 may execute at least one of one or more tasks generated by the subscriber server 104 and/or any other server of the system 100. Initially, the subscriber server 104 may transmit all the tasks to all the computing devices 108. In some embodiments, the subscriber server 104 may transmit all the tasks to a subset of the computing devices 108 configured to operate on data fields associated with the tasks. In some embodiments, the subscriber server 104 may transmit a task to only one computing device 108 configured to operate on data fields associated with that particular task. The subscriber server 104 may initially perform an analysis to determine a technical specialization and/or specification of each computing device 108, and then allocate the task to each computing device 108 based on the specialization and/or specification of the each computing device 108.

Computing devices 108 may execute various software modules for executing one or more tasks for processing of each event, based on one or more instructions and/or processes and/or data obtained from various internal and external data sources. Non-limiting examples of the computing devices 108 may include a server computer, a desktop, a laptop, a tablet, or the like.

Each computing device 108 may include a graphical user interface (GUI) that allows a user of any computing device 108 (for example, a first user of a first computing device) to interact with any other computing device 108 (for example, a second computing device) to receive, subscribe, and execute one or more tasks published on the GUI of the computing devices 108 by the subscriber server 104. Examples of the user interface of the computing devices 108 include, but are not limited to, a keypad embedded on computing device, a keyboard, a mouse, a roller ball, buttons, or other devices that allow a user of the computing devices 108 to interact with the computing devices 108. In some examples, the computing devices 108 does not include the user interface, and the user interacts with the computing devices 108 with a display (e.g., by providing various user gestures). In some examples, the user interacts with the computing devices 108 with the user interface and the display.

Software executed by each computing device 108 permits a user operating a respective computing device 108 to review and/or subscribe to at least one task transmitted and/or published on its graphical user interface by the subscriber server 104. In some embodiments, each computing device 108 GUI may receive tasks from the subscriber server 104 that are related to subject matter (e.g., type of task) or procedural role (e.g., time-sensitive task) of the respective user operating the each of the computing devices 108. The subscriber server 104 may process data associated with the events to generate tasks based on the subject matter (e.g., type of task) and/or the procedural role, and then transmit the tasks to the computing devices 108 based on a relationship between the subject matter and/or the procedural role of the task with the expertise of users operating the computing devices 108.

Each task may have a first data field identifying a nature of a potential operational work within the task and a second data field indicating a time-sensitive nature or a customer-sensitive nature of the potential operational work. Based on all the data fields, the subscriber server 104 and/or any other server of the system 100 may transmit to the computing devices 108 tasks having a subject matter or procedural data fields associated with credentials of users operating the computing devices 108. For instance, the credentials of a user specializing in person's identity verification process would indicate to a computing device 108 that the computing device 108 should subscribe to a task having a data field indicating that a particular task is related to verification of identity of the person. The tasks may be stored into dedicated databases or sub-databases of a database 106, where each sub-database is configured to store tasks with certain types of specific tasks. In such implementations, the computing devices 108 may be limited to accessing certain sub-databases according to the user credentials of the user operating a computing device 108. Similarly, the computing devices 108 may receive updates or notification messages related to the tasks from the subscriber server 104 and/or any other server of the system 100 that the computing devices 108 presents on a GUI to the user operating these computing devices 108.

The subscriber server 104 or other server of the system 100 may trigger and transmit a notification related to tasks to each computing device 108 having user credentials with access attributes indicating a role of a user to perform the tasks. For instance, a user may have credentials with attributes that indicate the user specializes in handling time-sensitive invoice generation tasks. When a new event related to invoices is received and/or detected by the subscriber server 104 and/or any other server of the system 100, the subscriber server 104 or other server of the system 100 may then generate a task related to an invoice creation for processing of the invoice event, and then the subscriber server 104 and/or any other server of the system 100 may transmit a notification message along with task data to a computing device 108 for a review of the task, a subscription to the task, and an execution of the task.

Each computing device 108 may have a GUI that allows a user operating their computing device 108 to mark or subscribe at least one task (for example, task1) of one or more tasks that is visible to users of other computing devices 108 so that other users operating the other computing devices 108 are notified that task1 has already been subscribed. A data field in a record of the task is then updated by the subscriber server 104 or other server of the system 100 to reflect the subscribe tag inputted by the user of the computing device 108. The subscribe tag may indicate a user's message that the task (for example, task1 as described earlier) has already been subscribed and should not be re-subscribed by remaining users of remaining computing devices 108. After subscription of the tasks, the computing device 108 may then perform various forms of processing on the data fields associated with the tasks, such as identifying and implementing actions and/or rules for completion of the task. In some embodiments, each computing device 108 may execute various computer models/protocols that indicate to the subscriber server 104 or other servers of the system 100 that a task has been subscribed, status of tasks while execution of tasks, problems while execution of tasks, and lastly, results of task when the task execution is completed.

Client devices 102 are computing and/or telecommunications devices including a processor and capable of performing the various processes described herein, such as accessing a webserver of a system 100 and providing a GUI interface to a user to interact with a customer-centric website hosted on a webserver. Non-limiting examples of the client device 102 may include a client computer (e.g., desktop, laptop, server, tablet), or any other telecommunications or computing device used to communicate with enterprise services. In some embodiments, the client device 102 is a computing device allowing a customer to interact with the subscriber server 104 or other servers of the system 100 via a webserver. The client device 102 may execute an Internet browser or a local application that access the webserver of the system 100 in order to issue requests or instructions to the subscriber server 104 or other servers of the system 100 to access the data and/or services of the system 100. The client device 102 may transmit credentials from user inputs to the webserver of the system 100, from which the webserver of the system 100 may generate a new user event to validate the identity of the user.

In operation, the client device 102 may execute an Internet browser that accesses the webserver of the system 100 hosting a website of an organization that allows customers to open a new account, access to their existing financial accounts, and allows promoters to advertise products to potential customers. Using the client device 102, a customer may select a product on the customer-centric website hosted by the webserver of the system 100. As the transaction proceeds, the client device 102 of the customer may be used upload machine-readable computer files (e.g., PDF, DOC, XSL) containing transaction information. The computer files may be stored into document records in the database 106.

The client device 102, the computing devices 108, and/or any other servers/devices of the system 100 may include any number of input devices configured to receive any number of data inputs (e.g., mouse, keyboard, touchscreen, stylus), including various types of data inputs allowing for processing and/or execution of the events and its associated tasks. An input device may be a keyboard, mouse, pointer, or other input generating device to facilitate input of instructions to a processor of the client device 102, the computing devices 108, and/or any other servers/devices of the system 100. The input unit of the client device 102, the computing devices 108, and/or any other servers/devices of the system 100 provides a portion of a user interface for these devices, and may include an alphanumeric keypad for inputting alphanumeric and other key information along with a cursor control device such as a mouse, a trackpad or stylus. A user interface display of the client device 102, the computing devices 108, and/or any other servers/devices of the system 100 may include a cathode ray tube (CRT) display, liquid crystal display (LCD), plasma, or light emitting diode (LED) display. In some examples, the display provides some or all of the functionality of a user interface of the client device 102, the computing devices 108, and/or any other servers/devices of the system 100. For instance, the display can be a touch-sensitive and/or presence-sensitive display that can display a graphical user interface (GUI) and detect input from a user in the form of user input gestures. A graphics subsystem may receive textual and graphical information and process the information for output to the display of the client device 102, the computing devices 108, and/or any other servers/devices of the system 100.

The client device 102, the computing devices 108, and/or any other servers/devices of the system 100 may be any computing device including a processor and non-transitory machine-readable storage medium allowing the client device 102, computing devices 108, and/or any other servers/devices of the system 100 to perform the various processes and instructions described herein. One or more processors of the client device 102, the computing devices 108, and/or any other servers/devices of the system 100 control the operations of the system 100. The one or more processors of the client device 102, the computing devices 108, and/or any other servers/devices of the system 100 may be an internal and/or external component of the client device 102, the computing devices 108, and/or any other servers/devices of the system 100. In one embodiment, a single processor may be employed in the client device 102, the computing devices 108, and/or any other servers/devices of the system 100. In another embodiment, a plurality of processors may be employed for configuring of the client device 102, the computing devices 108, and/or any other servers/devices of the system 100 as a multi-processor system. The processor of the client device 102, the computing devices 108, and/or any other servers/devices of the system 100 includes logic, circuitry, and interfaces that are operable to execute one or more instructions to perform processing of the event and/or execution of the one or more tasks associated with the event. The processor of the client device 102, the computing devices 108, and/or any other servers/devices of the system 100 can be realized through a number of processor technologies. The examples of the processor of the client device 102, the computing devices 108, and/or any other servers/devices of the system 100 include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor of the client device 102, the computing devices 108, and/or any other servers/devices of the system 100 may also include a Graphics Processing Unit (GPU) that executes the set of instructions to perform one or more processing operations.

A communication operational database 112 may be hosted on a server such as the subscriber server 104 and is capable of storing organization polices, rule files, events, tasks, and other customer and organization data in a plain format and/or an encrypted version containing data fields describing content of polices, rule files, events, tasks, and other customer and organization data. Non-limiting examples of what may be stored in the communication operational database 112 may include user records that may include document policies, and rule files that may comprise machine-readable computer files (e.g., word processing files), parsed portions of such computer files, or metadata associated with computer files; and application data that may include software instructions executed by the subscriber server 104 and/or event-generating/detecting devices such as a webserver or any other devices of the system 100.

The communication operational database 112 may be in communication with a processor of the subscriber server 104 and/or event-generating/detecting devices such as a webserver or any other electronic devices of the system 100, where the processor is capable of executing the various commands and/or instructions of the system 100. In some embodiments, the communication operational database 112 may be part of the subscriber server 104. In some embodiments, the communication operational database 112 may be a separate component in communication with the subscriber server 104 and/or event-generating/detecting devices such as a webserver or any other devices of the system 100.

The communication operational databases 112 may be in communication with one or more internal and external databases (not shown) via the network 110 and include a non-transitory machine-readable storage media capable of receiving, storing, updating polices, rule files, events, tasks, and other customer data. The communication operational databases 112 may have a logical construct of data files that are stored in non-transitory machine-readable storage media, such as a hard disk or memory, controlled by software modules of a database program (for example, SQL), and a related database management system (DBMS) that executes the code modules (for example, SQL scripts) for various data queries and management functions generated by the subscriber server 104, event-generating/detecting devices such as a webserver, and/or any other devices of the system 100.

A memory of the communication operational database 112 may be a non-volatile storage device for storing customer and organization data and instructions, to be used by a processor of the subscriber server 104 and/or event-generating/detecting devices such as a webserver or any other devices of the system 100 for processing and execution of the events and the tasks. The memory of the communication operational database 112 may be implemented with a magnetic disk drive, an optical disk drive, a solid-state device, or an attachment to network storage. The memory of the communication operational database 112 may include one or more memory devices to facilitate storage and manipulation of program code, set of instructions, tasks, data, PDKs, and the like. Non-limiting examples of memory implementations of the communication operational database 112 may include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory.

A memory of the communication operational database 112 may be a temporary memory, meaning that a primary purpose of the memory is not long-term storage. Examples of the volatile memories of the communication operational database 112 may include dynamic random access memories (DRAM), static random access memories (SRAM), and other forms of volatile memories known in the art. In some embodiments, the memory of the communication operational database 112 may be configured to store larger amounts of information than volatile memory. The memory of the communication operational database 112 may further be configured for long-term storage of information. In some examples, the memory of the communication operational database 112 may include non-volatile storage elements. Examples of such non-volatile storage elements of the memory of the communication operational database 112 include magnetic hard discs, optical discs, floppy discs, flash memories, or forms of electrically programmable memories (EPROM) or electrically erasable and programmable (EEPROM) memories.

As described above, the subscriber server 104 may comprise multiple modules and may utilize these modules to receive events, analyze events, update data formats, and transmit notifications (e.g., publish) tasks on one or more computers 108. The subscriber server 104 may also utilize one or more modules described herein to retrieve and transmit data from computers 108, the communications operational database 112 and the enterprise data warehouse 106.

The subscriber server 104 may include a communication processor 116, a communication batch processor 118, and an adapter 120. The communication processor 116 may include multiple internal modules, such as event container 122, output container 124, and handler manager 114. The communications processor 116 may retrieve individual events from the communications operational database 112 and process each event, as described above (e.g., retrieve rule files and generate tasks). When multiple tasks and multiple events have been identified and created, the communication batch processor 118 may retrieve relevant data from the communication processor 116, aggregate the tasks and events (and their corresponding data), and communicate with other computing devices described in FIG. 1 in batches. The communication batch processor 118 and the communication processor 116 may use various communication protocols, such as xPression, P8, e-delivery, and email notification systems to communicate various event/task data, notifications, and instructions with the computing devices described in FIG. 1. When communicating with other computing devices, the communication processor 116 and the communication batch processor 118 may use one or more of the above-mentioned communication protocols in accordance with the type and/or different attributes and requirements of each computing devices.

In some embodiments, the communication processor 116 may process the events and create the outputs and instructions that are stored onto the communications operational database 112 and the communication batch processor 118 may retrieve the outputs from the communications operational database 112 and transmit the outputs to different computing devices (e.g., computers 108). In some embodiments, the communication processor 116 may publish/transmits different tasks and/or instructions using an adapter 120. Because events and their corresponding data may include different file types, the adapter 120 may create a unified file for each event. The communication processor 116 may utilize the adapter 120 to allow the interface of an existing computer to be used as another interface communicating with another computer, without modifying the source code of the interfaces. The adapter 120 alleviates source applications from having to modify the source code or create extra files (e.g., XML file) of the event, which also reduces the computing/processing power used.

In some embodiments, the adapter 120 may receive data associated with an event and map the data to construct an XML file that is easily shared and transmitted to different computing devices described in FIG. 1. The adapter 120 may utilize multiple configurable components to map and construct the XML file representing each event. For instance, the adapter 120 may user a middleware to communicate with different computers 108, enterprise data warehouse 106, or communication operational database 112. The middleware may allow independent applications on system 100 to securely communicate with each other, using messages. The middleware may allow communication on a large number of platforms that would otherwise be incompatible (z/OS (mainframe), OS/400 (IBM System i or AS/400), Transaction Processing Facility, UNIX (AIX, HP-UX, Solaris), HP NonStop, OpenVMS, Linux, OS 2200, and Microsoft Windows). A non-limiting example of the middleware may include a MQ Listener application.

The above-mentioned components may further include an event controller component that determines when the events are published (based on various predetermined thresholds and criteria). In some embodiments, different notifications and/or instructions may be stored within a communication queue component and a communication trigger component may retrieve the events based on a predetermined order (e.g., predetermined priority order) and transmit them to the computers 108.

As described above, the communication processor 116 may utilize multiple modules/components to achieve the above-mentioned results (e.g., retrieve and analyze data corresponding to an event, generate outputs, notifications, and/or instructions associated with the event). In operation, the communication processor 116 may also perform formatting and transformation of data, when needed, for each target computer or other computers assigned to execute a task of an event. In some embodiments, the communication processor 116 may also update the event (e.g., update a rule file associated with the event) with post-source system data, such as marketing messages or announcements.

In some embodiments, the communication processor 116 may execute as a daemon process (e.g., as a background process without notifying any users) to determine events stored onto different computers (e.g., computers 108 and/or the communications operational database 112). In some configurations, if the communication processor does not identify an event, the communication processor 116 enters an "idle" mode for a configurable time period. In other configurations, the communication processor may continuously and iteratively crawl different relational databases to identify events and does not enter an idle mode.

When the communication processor 116 identifies an event, the communication processor may retrieve (e.g., query/crawl) different computers and/or databases to retrieve all data associated with the event. The communication processor 116 may use the data retrieved, in conjunction with event header information of the event, to construct an event object to be stored in an event container 122. The communication processor 116 may further include an output container 124 that stores output records created by the communication processor 116. The output container 124 may also retrieve and store one or more files generated as a result of execution of a task (e.g., when a task script or command has been executed by a computer 108).

The output types may include Output File Action—"FILE", Output P8 Index Action—"P8INDEX", and/or Output xPression Action—"XPRESSION". As the communication processor 116 processes the output records, an output handler may instantiate a collector class for that output type. The collectors may be used to process all records of that type. In some cases, the collectors may have sub-classes for customized needs. The collectors may also generate output required by the output target. For instance, a P8Index collector creates individual index files for the P8 ingestion and a control file. The xPression collector may generate a single XML file containing multiple document XML entries and a balance file may be generated for xPression processing.

The event container 122 may also contain a workspace map that holds work-in-progress data during processing of the event. The communication processor 116 may use the work-in-progress data for expression processing of the event data, as described below. In some embodiments, the event container 122 may contain named objects that can be used by actions and expressions module during processing of the events by the communication processor 116. The named objects may include: a) mmlogger—the logger object that allows messages to be logged; b) StringUtils—an object derived from the apache commons for general null-safe string manipulation; c) DateUtils—enables manipulation and transformation of dates; and d) currentdate—a java date object containing the current date/time.

The communication processor 116 may also identify an event type by an event registration ID, for example, a 4-digit number of the event. The event registration ID may be used to instantiate a handler for the event type. The handlers may be managed by a handler manager 114 that will create a handler for an event. In some embodiments, all action object classes extend an abstract action, and the action objects are utilized via an actionable interface. In some instances, an action object may be chained to other action objects. For the actions chained from an action in a main trunk, a chain-of-responsibility mode may be configured such that when chain-of-responsibility mode is true, the chain ends, and when an actions process, the process returns true. The default mode by a false mode, that is, all action objects in the chain are executed. For instance, the communication processor 116 may use metadata tagging to generate a chained action objects where each action object corresponds to a task. Using this chained action object, the subscriber server 104 (more particularly, the communication processor 116) may identify different attributes of one or more tasks. For instance, the chained action object may indicate an order in which each task must be performed.

The action object classes may include conditional actions, iteration multi actions, and pipeable actions. The conditional actions allow an 'if' expression to be evaluated and other action objects are executed depending on the result of the expression. If the expression result is true, a normal chained action may be executed, otherwise the 'else' action may be run. The 'if' and 'else' actions may be chained in a normal way. The iteration multi action may be a multi action that executes a configured list of the action objects while the result of an action object (called an iterator action) is true. The iteration multi action may be useful when processing multiple items in the event document, e.g., creating output for each recipient in the event by looping through a collection of recipients in the document. All of the action objects in the iteration multi action may be chained in a normal way. The pipeable actions may be action objects that operate on a single element or has a single input and output. The pipeable actions may be chained together to carry out a task, e.g., format a date element in the event document object. For example, the pipeable actions may be chained together using one or more of the action's properties.

In some embodiments, events may not be processed by the communication batch processor 116 because of technical issues (e.g., erroneous data supplied from a source system in the event itself or erroneous/missing data from other components (e.g., malfunctioning mobile device manager (MDM) services, or when the MDM services are not available). In some instances, a batch may not be processed by the communication batch processor 116 until predetermined data control thresholds are satisfied. However, a batch may be forced to process through manual intervention or by a communication batch monitor. Alternatively, a batch of events may be configured to be processed by a communication batch processor 118 regardless of a state of the events after a specified period has elapsed. For instance, a rule file or an object within an event may be configured such that the batch processor automatically processes the event.

In some embodiments, a communication batch monitor may be used to periodically check a status of different event batches being processed by the communication processor 116 and notifies the recipients via email, or other communication protocols. The communication batch monitor may identify batches containing errors from the processing of the communication processor 116 and reports each error, collect classes of errors (classified by a reason code), and send the errors to a configured list of recipients. In some configurations, the communication batch monitor uses two classes of reason codes: 4xx series and 5xx series. The 4xx series reason code classifies errors calling a MDM service (e.g., errors that may result when establishing a connection to a service, making a service call or receiving a service failure). The 5xx series reason code may classify eCDM/EDW data errors.

Figure 2:
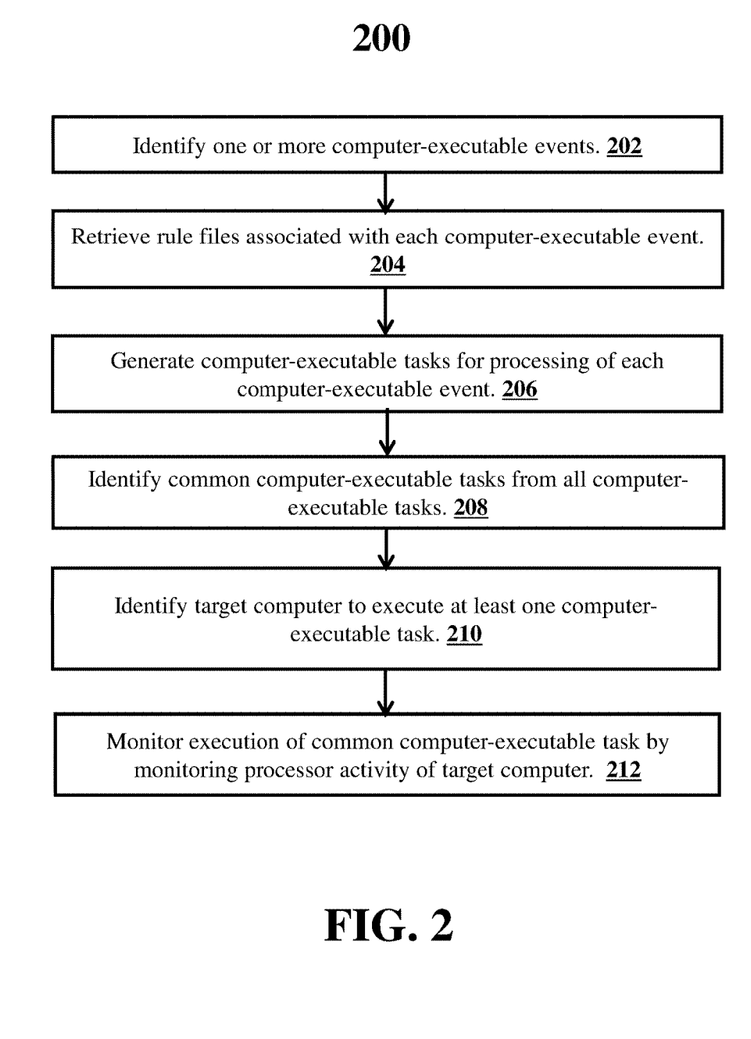
FIG. 2 is a flow diagram of a process executed in an event subscription and management system, according to an embodiment.

FIG. 2 shows execution steps for an event subscription and management, according to a method 200. The method 200 shown in FIG. 2 includes execution steps 202, 204, 206, 208, 210, and 212. However, other embodiments may include additional or alternative execution steps, or may omit one or more steps altogether. It should also be appreciated that other embodiments may perform certain execution steps in a different order; steps may also be performed simultaneously or near-simultaneously with one another. In addition, the method 200 of FIG. 2 is described as being executed by a server, referred to as the subscriber server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the subscriber server described herein.

In a first step 202, the subscriber server generates a user interface configured to be displayed on one or more computing devices operated by one or more users. One or more users may be employees who may access computer-executable events, computer-executable tasks, computer-executable task data, computer-executable event data, and various software applications on the user interface of their respective computing device. The user interface may be an interface of windows, pull-down menus, and toolbars where the users can receive data and manipulate data to execute one or more tasks based on one or more instructions. A window on the user interface of a computing device, for example, can represent a task file and the contents of the window can represent the records of the task file. The window can be opened, closed, or set aside on the computing devices. The records of the task file can be created, deleted, modified, and arranged in any manner by the users of the computing device for execution of the tasks. The user interface operating systems that provide the object-oriented environment for the computing devices may include but not limited to, Microsoft Windows and Apple operating systems.

The subscriber server may generate a user interface to be displayed on each of the one or more computing devices operated by one or more users such that the user interface displayed on the one or more computing devices is configured to receive a request for execution of tasks associated with an event from the subscriber server or any other servers of the system. In some embodiments, the subscriber server or any other servers of the system publishes one or more tasks and one or more instructions to execute the tasks on the user interface displayed on the one or more computing devices operated by the one or more users. In some configurations, a communication manager, which is a module of the subscriber server may publish and transmit different tasks.

Each computing device may be operable to modify content of one or more tasks and one or more instructions and/or data for execution of the one or more tasks on their user interface such that any information/data modified and published by any computing device maybe visible to other computing devices, the subscriber server, or any other servers of the system. In some embodiments, each computing device may be operable to modify content of one or more tasks and one or more instructions and/or data for execution of the one or more tasks on their user interface such that any information/data modified and published by any computing device maybe visible only to the subscriber server, but not to other computing devices of the system. In some embodiments, each computing device may be operable to modify content of one or more tasks, and one or more instructions and/or data for execution of the one or more tasks on their respective user interface such that any information/data modified and published by any computing device maybe visible only to the remaining computing devices, and not the subscriber server. In some embodiments, each computing device may be operable to modify and delete content of one or more tasks and one or more instructions and/or data for execution of the one or more tasks on their user interface such that any information/data modified and published by any computing device maybe visible only to computing devices of the systems selected by the computing device.

The subscriber server may receive a request containing one or more events from any event-generating/detection devices of the systems (e.g. networked system as described in FIG. 1). In some embodiments, the subscriber server automatically detect occurrence of an event corresponding to execution of a protocol. The protocol is associated with one or more organization polices of the system. For instance, the subscriber server, event-generating devices, event-detecting devices, or any other servers of the system may identify an event based on the execution of the one or more computer-executable rules associated with one or more organization polices of the system. For example, a computer-executable rule may define that an identity validation of each new user is conducted when the new user initiates a request for a new account with an organization. The subscriber server, the event-generating devices, the event-detecting devices, or any other servers of the system on identifying an occurrence of an incident where the new user has requested to open a new account, may then generate an event (for personal identification validation of the new user) based on the application of the computer-executable rule corresponding to the organization policy that defines that the validation of the personal identification of the new user is executed when the new user initiates the request for opening of the new account with the organization.

Each event generated and/or identified by the event-generating devices, the event-detecting devices, or any other servers of the system may contain an event identifier and/or an event body. The event identifier may include information such as an event registration ID identifying a type of event, a policy number, an agent ID, an agent number, and a customer ID. The event body may include an event type (or a type of an event) and event data/information corresponding to processing instructions of the event. The event body may further include information such as a description of the event and what the event entails, a priority timeline of the event, and a list of computing devices operated by a group of users that can be assigned to the event.

In some embodiments, each event identified by the event-detecting devices or any other servers of the system may not contain an event identifier and/or an event body. In such embodiments, the subscriber server or any other device of a system upon identification of the events may then subsequently generate the event identifier and the event body for each event. In some embodiments, the subscriber server, upon receiving and/or detecting the event, may automatically generate the event identifier and the event body for each event. In some embodiments, the subscriber server, upon receiving and/or detecting the event, may automatically modify and/or update the event identifier and the event body based on a computer-executable rule corresponding to an organization policy that is associated with a type of the event.

The subscriber server upon identifying the events may also retrieve data associated with each event from a non-transitory database based on the event identifier and/or the event body associated with each event. The data associated with each event may include, but not limited to, data of a customer, an account information associated with the customer, fund information associated with each event, etc. The subscriber server may update data associated with each event by incorporating one or more features into the data associated with each event. For instance, the subscriber server may incorporate and/or insert new features including, but not limited to, marketing messages or announcements into the data associated with each event. The new features such as marketing messages or announcements may be stored in a non-transitory database. The subscriber server may identify the new features that may be added to each event based on the event identifier and the event body of each event. For instance, the subscriber server may access reference/data table and perform a look up protocol where, using an event identifier, the subscriber server may retrieve the appropriate new features and information associated with the event and then incorporate the appropriate new features and information into the data associated with each event.

At step 204, the subscriber server upon identifying the events may retrieve one or more rule files associated with each event. The subscriber server may retrieve one or more rule files associated with each event from a non-transitory database based on the event identifier and the event body associated with the event. The one or more rule files may include a set of commands for execution of each event. For example, the set of commands may correspond to one or more processing instruction rule files associated with each event for processing of each event. In some embodiments, the one or more rule files retrieved by the subscriber server may include a set of instructions for execution and/or processing of the event. The one or more rule files may include step-by-step instructions for execution and/or processing of the event.

The one or more rule files may be generated and/or updated by any server of the network (e.g., system 100 described in FIG. 1). Rule files can be described or defined at different levels, with a rule often being composed of multiple organization rules where it may become desirable to extract a higher-level rule, or one of the lower-level rules of a multiple number of organization rules making up the higher level organization rule. For instance, when a first event is associated with a first department, a first rule file may be applicable for the first event. However, when a first event is associated with a second department, a second rule file may be applicable for the first event. This may occur because although a same event, that is, the first event occurred in both the first department as well as the second department, a different set of rules may be applicable depending upon attributes such as rank associated with each department where the event occurred. In one example, a first event may have been identified at multiple departments. The identifier of the first event may be associated to opening up of a bank account. In one case, the body of the first event may indicate that the first event originated in a first department, which may correspond that the first event has been requested by an existing customer. In second case, the body of the first event may indicate that the first event originated in a second department, which may indicate that the first event has been requested by a new customer. Therefore, although the same first event occurred at both departments, but the rule file applicable to the event in each may be different because a different set of instructions may be applicable for opening the account of the new customers versus for opening the account of the existing customers.

At step 206, the subscriber server may pre-process data associated with each event. The subscriber server may pre-process the data associated with each event based on one or more rule files corresponding to each event. The subscriber server may then generate one or more tasks, which may be synchronous tasks or asynchronous tasks, for processing of each event based on the pre-processing of the updated data associated with each event. Each task may include at least a portion of the set of commands. Each task may further be configured to be synchronously or asynchronously executed by at least one computer within a plurality of computers.

In some embodiments, the subscriber server may evaluate data associated with each event according to a set of rule files associated with each event retrieved from the database where the set of rule files may represent a logic that is applied to the data within each event in order to generate one or more tasks for the processing of each event. For that reason, in some embodiments, on application of the rule files associated with each event on the data associated with each event, the subscriber server may initially generate an action plan for processing each event of the one or more events. The action plan may include information associated with generation and execution of one or more tasks, which may be synchronous tasks or asynchronous tasks, to be executed by the different computing devices of the system for the processing of each event of the one or more events. For instance, the action plan may associated with the one or more tasks may include information such as whether the one or more tasks are to be executed simultaneously by different computing devices of the system for the processing of each event of the one or more events. For example, the action plan may include information that a task A has to be operated on a computer A and simultaneously a task B has to be operated on a computer B. The computer A and the computer B may work in parallel to execute the task A and task B to process the event associated with the task A and the task B. In some embodiments, the action plan generated by the subscriber server may include generation of one or more tasks such that the one or more tasks are to be executed by different computing devices of the system in synchronization with each other for the processing of each event of the one or more events. For instance, a task A has to be operated on a computer A and a task B has to be operated on a computer B. The computer A and the computer B may work in synchronization with each other to execute the task A and the task B to process the event. For example, the computer A while executing the task A may generate some output A', which may be a trigger point for the computer B to start executing the task B. In such a case, on generation of the output A', the computer A may transmit a notification to the computer B, and then the computer B may start operating on the task B. Each of one or more tasks may include name of a task, a description of task and what the task entails, a priority of task, and a list of users and/or their computing devices having unique technical specifications that can be assigned to the task. In some embodiments, each task may be executed by a single computing device and/or a multi-processor single computing device of the system.

At step 208, the subscriber server and/or any other server of a system may generate one or more batch of tasks including common tasks from all tasks generated for the processing the one or more events. The subscriber server and/or any other server of the system may select the common tasks from all the tasks generated for the processing of the one or more events, which may be executed by a specialized but a common computing device. For instance, the subscriber server and/or any other server of the system may select all the tasks from multiple tasks generated for processing of the one or more events into a first batch when all the tasks being added into the first batch may be executed by a specialized but a common computing device. In one non-limiting example, an event A may include a first task, a second task, and a third task, and an event B may include a fourth task and a second task. In such a case, for the execution of the event A and event B, there are total of five tasks where at least four task are unique tasks such as the first task, the second task, the third task, and the fourth task. The subscriber server will then select the common tasks from all the tasks of the event A and the event B, which is, the second task to be performed by a single computing device only. In another non-limiting example, an event A may include a first task, a second task, and a third task to be performed in a particular order. The content of the first task and the third task may be same, however, the first task and the third task may have to be performed separately. In such a case, the subscriber server will select the first task and third task as common tasks to be performed by a single computing device only.

At step 210, the subscriber server may determine one or more computing devices to execute one or more batch of tasks based on one or more operations to be performed within each batch of tasks of the one or more batch of tasks. For instance, the subscriber server may perform an analysis to determine technical data and operating system data of each computing device and specialization of a user associated with each computing device, and then allocate the batch of tasks to each computing device and the user associated with each computing device based on a correlation of the technical data and operating system data the each computing device and specialization of the user associated with each computing device with the data content and instructions associated with each of the batch of tasks. The data content may include nature of data of the tasks, format of the data of the tasks, volume of data of the tasks, and size of data of the tasks.

In response to identifying a target computer executing at least a part of a set of commands for at least one task based on a set of operational specification of the target computer, the subscriber server may then format data associated with the at least one task. The subscriber server may format the data associated with the at least one task according to technical operational requirements (such as operating system requirements) of each target computing device for execution of the at least one task to generate an updated data associated with each task. In some embodiments, the subscriber server may be configured to update data associated with the at least one task based on incorporation of the one or more features into the data associated with the at least one task, and formatting of the data upon the incorporation of the one or more features into the data associated with the at least one task. The subscriber server may store updated data associated with the at least one task in a database.

At step 212, the subscriber server upon identifying one or more target computers to execute one or more tasks may then transmit one or more instructions to each of the one or more target computers to execute the one or more batch of tasks for processing each event of the one or more events. The one or more instructions may be published on user interface of each target computer, and may include events details, rule file details, and other relevant data/information associated with the events and/or the tasks. The one or more instructions for each target computer may also include at least one batch of tasks identified from the one or more batch of tasks for each target computer. In some embodiments, the instructions may include particulars of name of at least one batch of tasks, a description of the at least one batch of tasks and what the at least one batch of task entails, and a priority of the at least one batch of task.

In some embodiments, the instructions received by each target computer may lead to publishing and display of information associated with all the batch of tasks on the user interface of each target computer. In some embodiments, the instructions received by each target computer may dynamically update the user interface of each target computer with information associated with all the batch of tasks. The information may include the particulars of names of all batch of tasks, a description of all batch of tasks and what all batch of tasks entails, and a priority of all the batch of tasks.

Each batch of tasks displayed on the user interface of each target computer may include at least two identifiers. A first identifier may indicate a target computer associated with executing the task. For example, a first batch of tasks may be displayed on user interface of a first target computer and a second target computer. The first batch of tasks may include a first identifier, which may be dynamically updated to indicate information associated with a first target computer. In other words, although the first batch of tasks is displayed on user interface of a first target computer and a second target computer, but the first identifier associated with the first batch of tasks may indicate that the first batch of tasks are to be operated on the first target computer. A second identifier associated with a batch of tasks may receive an execution request from a target computer. For example, a first batch of tasks may be displayed on user interface of a first target computer and a second target computer, and according to the first identifier associated with the first batch of tasks, the first batch of tasks are to be operated on the first target computer. When user of the first target computer subscribes to the first batch of tasks, then subscriber server may then disable the second identifier on the second target computer. In some embodiments, when the user of the first target computer subscribes to the first batch of tasks, then subscriber server may disable the second identifier on the second target computer and enable the first identifier on the first target computer.

In some configurations, the subscriber server may display the user interface on each computer associated with the event. In addition to the capabilities described above, the subscriber server may allow different computers to subscribe to different tasks. For instance, the subscriber server may display a first indicator associated with each task where the first indicator corresponds to the target-computing device. Additionally or alternatively, the server may display an input component where different computers associated with an event can subscribe to one or more tasks. In some configurations, when a common task is identified and assigned to a target computer, the input component corresponding to the common task is disabled, such that no other computer can assign (or request to be assigned) to that particular task.

Upon publishing of all the batch of tasks on a user interface of each target computer, users of each target computer may subscribe to one or more batch of tasks, and may transmit notifications to other target computers and/or the subscriber server regarding the one or more batch of tasks they have subscribed for execution, a schedule for completing milestones required by their subscribed batch of tasks, an estimated time for completing their subscribed batch of tasks, and a completion status upon executing their subscribed batch of tasks. Upon the subscription each of the one or more batch of tasks by each target computer, each target computer may execute their corresponding batch of tasks, and transmit a notification to the subscriber server upon the start of execution of the batch of tasks, the completion of the execution of the batch of tasks, and results of the execution of the batch of tasks.

In some embodiments, upon the subscription each of the one or more batch of tasks by each target computer, the subscriber server may then automatically monitor the start of execution of the batch of tasks, the completion of the execution of the batch of tasks, and results of the execution of the batch of tasks at each target computer. The subscriber server may monitor the status of each task at each target computer by monitoring operations and implementation of commands by a processor of each target computer. In some embodiments, the subscriber server may transmit a request to receive status updates associated with execution of the task to each target computer, and in response to the request, each target computer may periodically transmit updates associated with the status of the execution of the task. In some embodiments, the subscriber server may transmit a request to receive status updates associated with execution of the task at each target computer to a network computer associated with each target computer, and in response to the request, the network computer may periodically transmit updates associated with the status of the execution of the task at each target computer. The network computer may be configured to monitor network data of a system that includes each target computer, and based on evaluation of overall network data of the system, the network computer may determine a network load at each target computer. Based on a value of a network load at each target computer, the network computer may determine status of the task being executed at each target computer.

When a first target computer executes a common computer-executable task, then the first target computer may transmit a generated file to a second target computer or another computing device upon execution of the common computer-executable task. In some embodiments, when the first target computer executes a common computer-executable task or any other task, then the first target computer may transmit output data generated upon the execution of the common computer-executable task or any other task to a second target computer or another computing device upon execution of the common computer-executable task. In some embodiments, when the first target computer executes a common computer-executable task, then the first target computer may transmit a notification to a second target computer or another computing device upon successful execution and completion of the common computer-executable task.

In one non-limiting example, a task A is being executed on a target computer A. The computer A on successful execution of the task A may then output A, which may be a trigger point for a target computer B to start executing the task B. The target computer A may then transmit a notification along with the output A to the target computer B, and on receiving the notification the target computer B may start executing the task B. In another non-limiting example, a task A is being executed on a target computer A. The computer A on successful execution of some percentages of the task A may then have to notify a target computer B to start executing the task B. Upon the successful execution of some percentages of the task A, the target computer A may then transmit a notification to the target computer B, and on receiving the notification the target computer B may start executing the task B.

In addition to monitoring the execution of the common computer-executable tasks, as described in step 212, the subscriber server may also stop other computers within the network and/or associated with the event from executing some or all the script associated with the common task. For instance, the server may also monitor other computers associated with an event. If the server determines that a computer, other than the target computer, has executed at least a part of the script associated with the common task, the server may notify the computer that the script is assigned to the target computer. To prevent duplicative execution of automatic scripting protocols, the server may also end the process being executed by a processor of the computer and/or disconnect the computer from a network.

Figure 3:
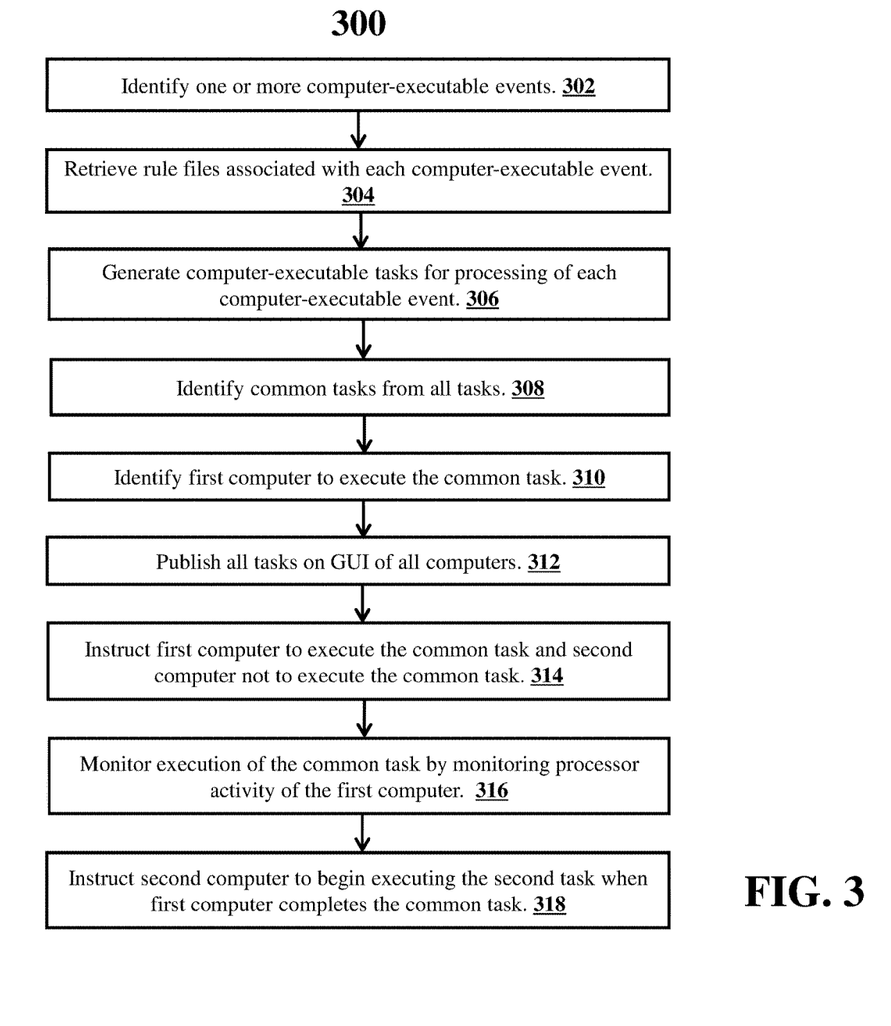
FIG. 3 is a flow diagram of a process executed in an event subscription and management system, according to an embodiment.

FIG. 3 shows execution steps for an event subscription and management, according to a method 300. The method 300 shown in FIG. 3 includes execution steps 302, 304, 306, 308, 310, 312, 314, 316, and 318. However, other embodiments may include additional or alternative execution steps, or may omit one or more steps altogether. It should also be appreciated that other embodiments may perform certain execution steps in a different order; steps may also be performed simultaneously or near-simultaneously with one another.

In addition, the method 300 is described as being executed by a server, referred to as a subscriber server in this embodiment. However, in some embodiments, steps may be executed by any number of computing devices operating in a distributed computing environment. In some cases, a computer executing one or more steps may be programmed to execute various other, unrelated features, where such computer does not need to be operating strictly as the subscriber server described herein.

In a first step 302, the subscriber server may identify initiation of one or more events within an enterprise network. In some embodiments, the subscriber server may receive a request containing the one or more events from an event-generating device and/or an event-detection device within the enterprise network. In some embodiments, the subscriber server, the event-generating device, or the event-detecting device may identify an event based on an execution of one or more guidelines associated with one or more organization policies of a network. For example, a guideline may define that an identity validation of each new user is conducted when a new user initiates a request for opening a new account. The subscriber server, the event-generating device, or the event-detecting device, upon identifying an occurrence of an incident where the new user has requested to open a new bank account, may generate an event associated with identification data validation of the new user based on the application of the guidelines corresponding to the organization policy.

In some configurations, each event may contain an event identifier and an event body. As described above, the event-generating device or the event-detecting device may generate an event identifier and an event body for each event, and transmit the event identifier and the event body to the subscriber server. In some embodiments, the subscriber server may generate an event identifier and an event body for each event. The event identifier of each event may include information such as an event registration ID, an agent ID, an agent number, and a customer ID. The event body of each event may include an event type (or a type of an event) and event data/information corresponding to processing instructions of the event. The event body may further include information such as a description of the event and what the event entails and a priority of the event.

At step 304, the subscriber server upon receiving and/or identifying one or more events may analyze each event based on an event identifier and an event body of each event, and then retrieve data associated with each event from an internal database and an external database. The data may include, but not limited to, personal information of a customer associated with the event, social media data associated with the customer, any existing account information associated with the customer, fund information associated with each event, etc.

The subscriber server may further retrieve one or more rule files associated with each event from a non-transitory database. The subscriber server may retrieve the rule files associated with each event from a non-transitory database based on information within the event identifier and the event body associated with the event. The rule files may include process steps for execution of each event. For example, when an event is associated with identity verification of a new customer, a rule file associated with the event may include data associated with how to perform identify verification, a timeline for verification process, how to user verification information, etc. In some embodiments, the rule files may further include a set of commands for execution of each event. For example, the set of commands may correspond to one or more processing instruction rule files associated with each event for processing of each event. In some embodiments, the one or more rule files retrieved by the subscriber server may include a set of instructions for execution and/or processing of the event. The one or more rule files may include step-by-step instructions for execution and/or processing of the event. For example, a rule file may indicate that a first step for identity verification of a new customer is to monitor social media activity of the new user/customer, a second step is to verify credit history of a user, etc.

At step 306, the subscriber server may pre-process data associated with each event. The subscriber server may pre-process the data associated with each event based on one or more rule files corresponding to each event. The subscriber server may then generate one or more tasks for processing of each event based on the pre-processing of the data associated with each event. Each task may include name of a task, a description of task and what the task entails, a priority of task, and a list of users and/or their computing devices having unique technical specifications that can be assigned to the task.

Each task may have be executed by a single computing device and/or a multi-processor single computing device of the system. Furthermore, the tasks may be synchronous tasks or asynchronous tasks where each task may include a portion of a set of commands. For example, the synchronous tasks may include a set of two or more tasks that have to be execute simultaneously by two or more computers. The asynchronous tasks may include a set of two or more tasks that do not have to be simultaneously executed at two or more computers. Some asynchronous tasks may require a computer to delay the process until another computer has completed the previous task. Furthermore, as described above, some tasks require the output of a previous task performed by another computer.

In some embodiments, the subscriber server examine data associated with each event in accordance with examination of content within a set of rule files associated with each event to generate one or more tasks for the processing of each event. Accordingly, the subscriber server, on analyzing and examining the data associated with each event and the content within the rule file associated with the event, may initially generate an action plan for processing each event. The action plan may include information associated with total number of tasks to be generated, a list of computing devices that are going to execute the tasks, a timeline for execution of each task, instructions associated with how to execute each task, and a list of useful resources for execution of each task. The action plan may further include information such as whether the tasks are going to be synchronous tasks or asynchronous tasks, which have to be executed by different or same computing devices.

In a non-limiting example, the action plan may include information that a task A has to be operated on a computer A and simultaneously a task B has to be operated on a computer B. The computer A and the computer B may have to work in parallel to execute the task A and the task B in order to process the event associated with the task A and the task B. In another non-limiting example, the action plan may include information that a task A has to be operated on a computer A and a task B has to be operated on a computer B. The computer A and the computer B may work in synchronization with each other to execute the task A and the task B to process the event. For example, the computer A while executing the task A may generate some output A', which may be a trigger point for the computer B to start executing the task B. In such a case, on generation of the output A', the computer A may transmit a notification (along with an output file and/or other data) to the computer B, and then the computer B may start executing the task B.

At step 308, the subscriber server may identify common tasks from all tasks associated all events. For example, processing of an event A may include execution of a task A, a task B, and a task C; and processing of an event B may include execution of a task A, and a task D. In such a case, the subscriber server may determine that the task A is a common task associated with both the event A and the event B, and tag the task A as a common task.

Each task is executed by a specialized computing device. In addition, the common tasks are executed by a specialized but a common computing device. In one non-limiting example, an event A may include a first task, a second task, and a third task. Moreover, an event B may include a fourth task and a second task. In such a case, for the execution of the event A and event B, there are total of five tasks where at least four tasks are unique tasks such as the first task, the second task, the third task, and the fourth task. The subscriber server will then select the common tasks from all the tasks of the event A and the event B, which is, the second task, to be performed by a single computing device only. In another non-limiting example, an event A may include a first task, a second task, and a third task to be performed in a particular order. The content of the first task and the third task may be same, however, the first task and the third task may have to be performed separately. In such a case, the subscriber server will select the first task and third task as common tasks to be performed by a single computing device only.

At step 310, the subscriber server may determine one or more computers configured to execute the tasks. In some embodiments, the subscriber server may identify each computing device to execute each task based on analysis and correlation of information and/or attributes associated with all the tasks and all the computers. The information associated with each task may include name of a task, a description of task and what the task entails, a priority of task, and technical specification of data associated with the task, technical specification of computers required to do the task. The information associated with each task may further include a nature of data of the tasks, a format of the data of the tasks, a volume of data of the tasks, and a size of data of the tasks. The information associated with each computer may include a type of operating system, a version of operating system, a size of memory, a speed of a processor, and a list of software's installed on the computer.

In some configurations, the subscriber server may retrieve one or more thresholds associated with technical requirements for each task from the one or more rule files. For instance, a rule file may indicate one or more attributes of a computer required to execute the set of commands/script of a task. As described above, the one or more attributes may correspond to hardware and/or software attributes required to execute each task. For instance, a task may require to be performed by a dual processing computer, a computer with a predetermined operating system that manages the computer's memory and processes, as well as all of its software and hardware in accordance with one or more predetermined criteria, and the like. The subscriber server may select a computer configured (e.g., well suited) to execute the common task in accordance with the common task's requirements and the computer's attributes.

In some embodiments, when multiple computers are configured to execute the common task, the subscriber server may select a computer at random, using a round robin protocol, or other suitable processes. The subscriber server may optimize the execution of the event by minimizing latency to the extent the selected computer is geographically separated from other computers executing other related tasks. Therefore, the subscriber server may also account for geographic attributes of each computer. In some embodiments, the subscriber server may retrieve a routing table that has preferential and/or prioritized routing of different tasks to different computers. For instance, in some embodiments, the routing tables may have a higher preference to route a certain type of tasks to a predetermined group of computers.

In some embodiments, in response to identifying a target computer appropriate for executing at least a part of a set of commands for at least one task based on a set of operational specifications of the target computer, the subscriber server may then format all or a portion of data associated with the at least one task. For example, a computer A may be operable to execute two out of total of three sub-tasks of a task A, and based on the analysis and correlation of the information associated with the task A and the technical specification of the computer A, the subscriber server may determine that the computer A is not able to execute one of the sub-task of the task A because of format of data associated with the execution of the sub-task. As a result, the subscriber server may format the data associated with said sub-task to make it compatible according to technical specification of the computer A, thus the computer A may now be operable to execute all there sub-tasks of the task A. The subscriber server may store updated data associated with the task A in a database.

At step 312, the subscriber server upon identifying multiple target computers to execute multiple unique tasks may then publish (e.g., generate and transmit notifications) all the multiple unique tasks on a GUI of all target computers. For example, upon identifying three unique tasks (task A-C) and three computers (computers A-C). The subscriber server may generate and transmit an indicator of each task on each computer. For instance, the subscriber server may publish task A, task B, and task C on GUI of computer A, computer B, and computer C. Each task A-C displayed on the GUI of the computers A-C may include information associated with each task, a timeline for each task, etc.

At step 314, the subscriber server may transmit instructions to each target computer to execute a task assigned for them. The instructions may be published on the GUI of each target computer. The instructions may include events data, rule file data, and other relevant information associated with the event and/or the task. The instructions may further include particulars of name of a task, a description of the task and what the task entails, and a priority of the of task. In one non-limiting example, the subscriber may assign a first task to a first computer and a second task to a second computer. In such a case, the subscriber may transmit an instruction to the first computer to start executing the first task. At the same time, the subscriber may transmit an instruction to the second computer to not to execute the first task. The instruction may include information associated with a start time of the task, an end time of the task, how to execute the task, how to generate an output of the task, a format of an output file of the task, etc.

At step 316, the subscriber server may monitor the execution of a task at a target computer (e.g., initiating of the task, a completion of the execution of the task, and results of the execution of the task). For example, the subscriber server may monitor status of execution of the first task at the first computer. The subscriber server may monitor the status of each task at each target computer by monitoring operations and implementation of commands by a processor of each target computer. In some embodiments, the subscriber server may transmit a request to receive status updates associated with execution of the task to each target computer, and in response to the request, each target computer may periodically transmit updates associated with the status of the execution of the task.

In some embodiments, the subscriber server may transmit a request to receive status updates associated with execution of the task at each target computer to a network computer associated with each target computer, and in response to the request, the network computer may periodically transmit updates associated with the status of the execution of the task at each target computer. The network computer may be configured to monitor network data of a system that includes each target computer, and based on evaluation of overall network data of the system, the network computer may determine a network load at each target computer. Based on a value of a network load at each target computer, the network computer may determine status of the task being executed at each target computer.

At step 318, the subscriber server, upon determining that the first computer has completed the first task, and the first task and the second task are related to each other such that the second task has to be performed on the completion of the first task based on results of the first task, may transmit an instruction to the second computer to start executing the second task. The subscriber server may also transmit an output file generated by the first computer in response to execution of the first task to the second computer along with an instruction indicating that the second computer has to start executing the first task. In some embodiments, the subscriber server may format the output file in accordance with the technical specification of the second computer prior to transmitting the output file to the second computer. In some embodiments, the subscriber server may format content of the output file in accordance with the specification of the second task to be executed at the second computer prior to transmitting the output file to the second computer. Upon the completion of the second task and all the remaining tasks by the target computers, the subscriber server may tag the task and the event as completed in the database.

Example 1

In a non-limiting example, a server identifies two events being executed by two computers. The server identifies the two events upon receiving an indication from each computer that identifies each event. Upon receipt, the server retrieves data associated with each event, using an identifier of each event. The data associated with each event includes at least a rule file associated with each event where each rule file contains a set of computer-executable scripts and commands to be executed by one or more computers to complete the event. Based on the evaluation of the content of the rule file, the server may generate a hierarchical series of synchronous and/or asynchronous tasks where each task comprises at least a portion of the set of computer-executable scripts and commands. In other words, content associated with each rule file assists the server in creating the multiple tasks and their corresponding computer executable scripts where each task can be executed by one or more computers, and where the events is completed upon execution of all the tasks.

Upon retrieving and evaluating each rule file, the server identifies different tasks associated with each event. The server further identifies a common task between the two events. For example, the server identifies that task A is shared between the events executed (at least partly) by the first and the second computers. Upon identifying the common task A, the server identifies that the first computer is more suitable to execute the computer executable script of task A (script A). This identification may be based on technical specifications required to execute script A. These technical specifications may be included in the rule file retrieved by the server.

Upon identifying the first computer as technically suitable to execute task A, the server may notify both computers that task A has been assigned to the first computer. The server may further monitor the first computer and determine a status of execution of script A. When the server identifies that the first computer has executed/completed script A, the server retrieves one or more output files generated as a result of the execution of the script A, which may be stored in a memory of the first computer and/or another database. The server then transmits the one or more output files to the second computer.

Example 2

A server identifies two computers assigned to two different events and identifies a common task, as described in example 1. The server displays a graphical user interface (GUI) on each computer. The GUI displays all tasks associated with each event where the tasks are generated in accordance with evaluation results of each event's rule file. The GUI further displays an indicator associated with each task where the indicator corresponds to an identifier of a computer assigned to execute the computer executable script of each respective task. The GUI further displays an input component (e.g., radio buttons, input fields, and the like) where each computer can request to be assigned to each respective task. When the server identifies the first computer as technically suitable to execute the script A, the server updates the GUI to reflect the first computer as the computer assigned to task A. The server also disables the input component of the task A, such that the second computer is unable to request the task A.

Example 3

The server identifies two computers assigned to two different events and identifies a common task, as described in example 1. The server monitors the second computer to determine whether the second computer is executing some or all of script A. When the server determines that the second computer, which is not assigned to task A, is executing at least a predetermined portion of script A, the server transmits a notification to the second computer. In some embodiments, the server may stop and/or prevents the second computer from executing any (or a predetermined portion of) script A.

The above-mentioned examples significantly reduce duplicate execution of common computer executable scripts and commands, which inevitably leads to less processing and computing power needed and/or used. For instance, the second computer is informed that the first computer is assigned to execute script A of task A. Therefore, the second computer does not (and in some examples cannot) execute the script A of task A.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A server-implemented method comprising:
identifying, by a server, a plurality of computer-executable events, each computer-executable event comprising an event identifier;
retrieving, by the server using the event identifier, one or more rule files associated with each computer-executable event, each rule file comprising a first set of commands for execution of each computer-executable event;
generating, by the server based on at least one rule file, a plurality of computer-executable tasks for each computer-executable event where each computer-executable task is configured to be synchronously or asynchronously executed by at least one computer within a plurality of computers, each computer-executable task comprising at least a second set of commands, wherein each second set of commands of each computer-executable task comprises at least a portion of the first set of commands;

identifying, by the server, a first computer-executable task common among the plurality of computer-executable events;

upon identifying a first computer configured to execute a first set of commands of the first computer-executable task, transmitting, by the server to the first computer, a first instruction causing the first computer to execute the second set of commands of the first computer-executable task;

upon identifying a second computer within the plurality of computers configured to execute a second computer-executable task, transmitting, by the server to the second computer, a second instruction to not execute the second set of commands of the first computer-executable task;

when the first computer executes the second set of commands of the first computer-executable task:
 transmitting, by the server, a file generated by the first computer in response to execution of the second set of commands of the first computer-executable task, to the second computer; and
 instructing, by the server, the second computer to execute a second set of commands of the second computer-executable task using the file.

2. The server-implemented method of claim 1, further comprising:
 dynamically updating, by the server, a user interface displayed on each computer within the plurality of computers to display the plurality of computer-executable tasks where each task is displayed with at least two identifiers:
  a first identifier configured to indicate a computer associated with executing at least one computer-executable task, and
  a second identifier configured to receive an execution request for each respective task from at least one computer.

3. The server-implemented method of claim 2, wherein the first identifier of the first computer-executable task is dynamically updated to correspond to the first computer.

4. The server-implemented method of claim 2, wherein the server dynamically disables a second identifier of the first computer-executable task for all computers within the plurality of computers except the first computer.

5. The server-implemented method of claim 1, wherein the server updates a format of one or more files associated with the first computer-executable task in accordance with one or more attributes of the first computer.

6. The server-implemented method of claim 1, wherein the rule file comprises an event body comprising event content and information corresponding to processing and execution steps of each computer-executable event of the one or more computer-executable event.

7. The server-implemented method of claim 1, wherein each computer-executable event is initiated by a user.

8. The server-implemented method of claim 1, wherein each computer-executable event is initiated by an administrator of the plurality of computers.

9. The server-implemented method of claim 1, wherein the one or more rule files comprises a defined set of guidelines for processing of each computer-executable event of the one or more computer-executable events, and wherein the one or more rule files are generated and updated by the server.

10. The server-implemented method of claim 1, wherein each computer-executable task comprises a name of the computer-executable task, a description of the computer-executable task and what the computer-executable task entails, and a priority of the computer-executable task.

11. A system comprising:
 a plurality of computers configured to execute a plurality of computer-executable events;
 a database configured to store a rule file containing comprising a first set of commands for execution of the plurality of computer-executable events;
 a server in communication with each computer within the plurality of computers, the sever configured to:
  identify the plurality of computer-executable events, each computer-executable event comprising an event identifier;
  retrieve, using the event identifier, one or more rule files associated with each computer-executable event, each rule file comprising a first set of commands for execution of each computer-executable event;
  generate, based on at least one rule file, a plurality of computer-executable tasks for each computer-executable event where each computer-executable task is configured to be synchronously or asynchronously executed by at least one computer within a plurality of computers, each computer-executable task comprising at least a second set of commands, wherein each second set of commands of each computer-executable task comprises at least a portion of the first set of commands;
  identify, a first computer-executable task common among the plurality of computer-executable events;
  upon identifying a first computer configured to execute a first set of commands of the first computer-executable task, transmit, to the first computer, a first instruction causing the first computer to execute the second set of commands of the first computer-executable task;
  upon identifying a second computer within the plurality of computers configured to execute a second computer-executable task, transmit, to the second computer, a second instruction to not execute the second set of commands of the first computer-executable task;
  when the first computer executes the second set of commands of the first computer-executable task:
   transmit a file generated by the first computer in response to execution of the second set of commands of the first computer-executable task, to the second computer; and
   instruct the second computer to execute a second set of commands of the second computer-executable task using the file.

12. The system of claim 11, wherein the server is further configured to:
 dynamically update a user interface displayed on each computer within the plurality of computers to display the plurality of computer-executable tasks where each task is displayed with at least two identifiers:
  a first identifier configured to indicate a computer associated with executing at least one computer-executable task, and a second identifier configured to receive an execution request for each respective task from at least one computer.

13. The system of claim 12, wherein the first identifier of the first computer-executable task is dynamically updated to correspond to the first computer.

14. The system of claim 12, wherein the server dynamically disables a second identifier of the first computer-executable task for all computers within the plurality of computers except the first computer.

15. The system of claim 11, wherein the server updates a format of one or more files associated with the first computer-executable task in accordance with one or more attributes of the first computer.

16. The system of claim 11, wherein the rule file comprises an event body comprising event content and information corresponding to processing and execution steps of each computer-executable event of the one or more computer-executable event.

17. The system of claim 11, wherein each computer-executable event is initiated by a user.

18. The system of claim 11, wherein each computer-executable event is initiated by an administrator of the plurality of computers.

19. The system of claim 11, wherein the one or more rule files comprises a defined set of guidelines for processing of each computer-executable event of the one or more computer-executable events, and wherein the one or more rule files are generated and updated by the server.

20. The system of claim 11, wherein each computer-executable task comprises a name of the computer-executable task, a description of the computer-executable task and what the computer-executable task entails, and a priority of the computer-executable task.

* * * * *